2,810,724

BIS [2-BETA-(ALPHA'-4'-PYRIDYL-ETHYLTHIO) PROPIONAMIDO-PHENYL]DISULFIDE

Robert M. Pierson, Ravenna, Ohio, assignor to The Goodyear Tire & Rubber Company, Akron, Ohio, a corporation of Ohio No Drawing. Application June 12, 1956, Serial No. 590,822

2 Claims. (Cl. 260—294.8)

This invention relates to the new composition of matter bis-[2-β-(α'-4'-pyridyl-ethylthio) propionamido-phenyl] disulfide. A method for the preparation of this compound is shown below:

EXAMPLE 1

500 grams of β-(α'-4'-pyridyl-ethylthio) propionic acid (prepared as described below and as described in copending application Serial No. 590,821, filed June 12, 1956) was suspended in 50 cubic centimeters ot chloroform. To this mixture was added 5.64 grams of thionyl chloride. Upon standing 1 hour at 25° C., the acid dissolved, whereupon the solution was refluxed 0.25 hour. The chloroform and unreacted thionyl chloride were removed under reduced pressure, and a yellow oily residue was obtained. This yellow oily residue was redissolved in 50 cubic centimeters of chloroform. A solution of 2.94 grams of bis-(2-amino-phenyl) disulfide in 20 cubic centimeters of chloroform, and 7.77 grams of anhydrous sodium actate were then added to the residue. After refluxing the system for 1 hour, the inorganic salt was filtered from the system. The chloroform filtrate was washed twice with dilute sodium bicarbonate solution and then with water. The solution was dried and the chloroform removed by evaporation. The brown syrupy residue weighing 7.12 grams (61% yield) had an equivalent weight of 314 (based upon amine group titre with perchloric in acetic acid) as compared with a theoretical equivalent weight of 317.5 for bis-[2-β-(α'-4'-pyridyl-ethylthio) propionamido-phenyl] disulfide.

This compound has been found useful as a modifier in the preparation of synthetic rubber.

This invention also relates to β-(α'-4'-pyridyl-ethylthio) propionic acid.

*Preparation of β-(α'-4'-pyridyl-ethylthio) propionic acid*

By adding a mol equivalent of β-mercapto propionic acid to 4-vinyl pyridine (containing 0.1% by weight of hydroquinone as a polymerization inhibitor), a crystalline product was formed with evolution of heat. By recrystallizing the solid product from ethanol, a white crystalline compound (melting point 154.0–154.5° C.) was obtained. Analysis showed the carbon, hydrogen, nitrogen and sulfur contents to be 56.60%, 6.13%, 6.43% and 15.13% by weight respectively. Theoretical amounts of these constituents in the formula $C_{10}H_{13}NO_2S$ are 56.83%, 6.20%, 6.63% and 15.17% by weight respectively. A band attributable to terminal methyl groups at 1734 cm.$^{-1}$ was found in the infra red spectrum of this compound which was assigned the name β-(α'-4'-pyridyl-ethylthio) propionic acid.

While certain representative embodiments and details have been shown for the purpose of illustrating the invention, it will be apparent to those skilled in this art that various changes and modifications may be made therein without departing from the spirit or scope of the invention.

What is claimed is:

1. As a new composition of matter bis-[2-β-(α'-4'-pyridyl-ethylthio) propionamido-phenyl] disulfide defined by the formula:

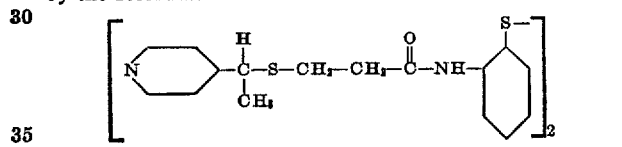

2. As a new composition of matter β-(α'-4-pyridyl-ethylthio) propionic acid defined by the formula

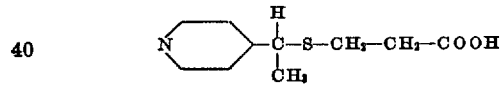

References Cited in the file of this patent
UNITED STATES PATENTS 2,607,775   Vinton _____ Aug. 19, 1952

UNITED STATES PATENT OFFICE
CERTIFICATE OF CORRECTION

Patent No. 2,810,724

October 22, 1957

Robert M. Pierson

It is hereby certified that error appears in the printed specification of the above numbered patent requiring correction and that the said Letters Patent should read as corrected below.

Column 1, line 33, for "actate" read -- acetate --; column 2, line 36, for "-4-" read -- -4'- --.

Signed and sealed this 3rd day of December 1957.

(SEAL)
Attest:

KARL H. AXLINE
Attesting Officer

ROBERT C. WATSON
Commissioner of Patents